(12) United States Patent
Yang et al.

(10) Patent No.: US 12,111,122 B2
(45) Date of Patent: Oct. 8, 2024

(54) HEAT EXCHANGER AND HEAT EXCHANGE SYSTEM

(71) Applicant: HANGZHOU SANHUA RESEARCH INSTITUTE CO., LTD., Hangzhou (CN)

(72) Inventors: Zhenbo Yang, Hangzhou (CN); Zhaogang Qi, Hangzhou (CN); Weidong Xu, Hangzhou (CN); Linjie Huang, Coconut Creek, FL (US)

(73) Assignee: HANGZHOU SANHUA RESEARCH INSTITUTE CO., LTD., Hangzhou (CN)

(*) Notice: Subject to any disclaimer, the term of this patent is extended or adjusted under 35 U.S.C. 154(b) by 350 days.

(21) Appl. No.: 17/552,888

(22) Filed: Dec. 16, 2021

(65) Prior Publication Data

US 2022/0107146 A1    Apr. 7, 2022

Related U.S. Application Data

(63) Continuation of application No. PCT/CN2020/105114, filed on Jul. 28, 2020.

(30) Foreign Application Priority Data

Aug. 1, 2019   (CN) .......................... 201910708413.8

(51) Int. Cl.
*F28F 9/02*       (2006.01)
*F25B 39/00*      (2006.01)
(Continued)

(52) U.S. Cl.
CPC ............ *F28F 9/0204* (2013.01); *F25B 39/00* (2013.01); *F28F 1/22* (2013.01); *F28F 1/40* (2013.01); *F25B 2339/00* (2013.01)

(58) Field of Classification Search
CPC ... F28F 9/0204; F28F 1/22; F28F 1/40; F25B 39/00; F25B 2339/00
(Continued)

(56) References Cited

U.S. PATENT DOCUMENTS 5,205,347 A    4/1993   Hughes
7,896,066 B2 * 3/2011   Higashiyama ...... F28D 1/05391
                                                      165/174
(Continued)

FOREIGN PATENT DOCUMENTS

CN          1961193 A      5/2007
CN        100483045 C      4/2009
(Continued)

*Primary Examiner* — Claire E Rojohn, III
(74) *Attorney, Agent, or Firm* — Cheng-Ju Chiang

(57) ABSTRACT

A heat exchanger includes a first collecting pipe, a number of heat exchange tubes and a partition plate. The heat exchange tubes are inserted into the first collecting pipe. By means of the partition plate, a first inner cavity of the first collecting pipe is divided into a first sub-cavity and a second sub-cavity. One end of each heat exchange tube is in communication with the first sub-cavity. In the process of a refrigerant entering the first collecting pipe, the refrigerant flows into the second sub-cavity firstly, and forms a severe turbulence effect after interacting with the heat exchange tubes inserted into the second sub-cavity. Then, the refrigerant flows into the first sub-cavity through holes provided in the partition plate, and then flows into the heat exchange tubes. As a result, the uniformity of the two-phase refrigerant distribution can be relatively improved.

20 Claims, 7 Drawing Sheets

(51) Int. Cl.
*F28F 1/22* (2006.01)
*F28F 1/40* (2006.01)

(58) Field of Classification Search
USPC .................................. 165/153, 159; 62/498
See application file for complete search history.

(56) References Cited

U.S. PATENT DOCUMENTS

| | | | | |
|---|---|---|---|---|
| 7,992,401 | B2* | 8/2011 | Higashiyama | F28D 1/05391 62/515 |
| 8,146,652 | B2* | 4/2012 | Higashiyama | F28F 9/0204 165/174 |
| 8,210,246 | B2* | 7/2012 | Bhatti | F28D 1/0426 165/165 |
| 8,371,366 | B2* | 2/2013 | Higashiyama | F28D 1/05391 165/174 |
| 8,726,976 | B2* | 5/2014 | Schrader | F28D 1/05391 29/890.052 |
| 8,935,854 | B2* | 1/2015 | Hirayama | F28D 1/05391 29/890.052 |
| 9,033,029 | B2* | 5/2015 | Park | F28F 9/0273 165/151 |
| 9,267,737 | B2* | 2/2016 | Matter, III | F28D 1/05383 |
| 9,328,966 | B2* | 5/2016 | Braüning | F28F 9/02 |
| 9,625,219 | B2* | 4/2017 | Takagi | F28F 9/028 |
| 10,281,217 | B2* | 5/2019 | Holmes | F28F 9/0224 |
| 11,236,954 | B2* | 2/2022 | Takafuji | F28D 1/05333 |

FOREIGN PATENT DOCUMENTS

| | | |
|---|---|---|
| CN | 102384692 A | 3/2012 |
| CN | 103003653 A | 3/2013 |
| CN | 103837025 A | 6/2014 |
| CN | 203642562 U | 6/2014 |
| CN | 103983126 A | 8/2014 |
| CN | 104154801 A | 11/2014 |
| CN | 104913547 A | 9/2015 |
| DE | 3302150 A1 | 7/1984 |
| EP | 3264019 A1 | 1/2018 |
| JP | 2004-162992 A | 6/2004 |
| JP | 2005-321137 A | 11/2005 |
| WO | 2021/018126 A1 | 2/2021 |

* cited by examiner

HEAT EXCHANGER AND HEAT EXCHANGE SYSTEM

CROSS-REFERENCE TO RELATED APPLICATION

This application is a bypass continuation of National Phase conversion of International (PCT) Patent Application No. PCT/CN2020/105114, filed on Jul. 28, 2020, which further claims priority of a Chinese Patent Application No. 201910708413.8, filed on Aug. 1, 2019 and titled "HEAT EXCHANGER AND HEAT EXCHANGE SYSTEM", the entire content of which is incorporated into this application herein by reference.

TECHNICAL FIELD

The present disclosure relates to a field of heat exchange, specifically, to a heat exchanger and a heat exchange system.

BACKGROUND

The heat exchange industry is developing rapidly, and as one of the main components of air conditioners, heat exchangers also need to be improved and optimized in design. The heat exchanger includes collecting pipes and heat exchange tubes. When refrigerant flows into the heat exchanger, it is distributed into the heat exchange tubes through the collecting pipes. However, when the refrigerant is gas-liquid two-phase in related heat exchangers, its distribution uniformity needs to be improved.

SUMMARY

According to an aspect of the present disclosure, it provides a heat exchanger including a first collecting pipe, a heat exchange tube and a partition plate; the first collecting pipe including a pipe wall and a first inner cavity; the first collecting pipe including a first end portion and a second end portion in a length direction thereof; the partition plate being disposed in the first inner cavity and extending from the first end portion along the length direction of the first collecting pipe so as to divide the first inner cavity into a first sub-cavity and a second sub-cavity, the first sub-cavity and the second sub-cavity being parallel in the length direction of the first collecting pipe; the heat exchange tube including a tube wall and a refrigerant channel for refrigerant to flow, the heat exchange tube having a first end and a second end in an extending direction thereof, the refrigerant channel extending from the first end to the second end and extending through the heat exchange tube; the pipe wall of the first collecting pipe further defining a first insertion hole, the partition plate defining a second insertion hole corresponding to the first insertion hole, the first end of the heat exchange tube passing through the first insertion hole and being inserted into the second insertion hole; the partition plate defining a through hole, the through hole and the second insertion hole being disposed in a staggered manner, the through hole being in communication with the first sub-cavity and the second sub-cavity; the heat exchanger further including a first inlet/outlet, the first inlet/outlet being disposed at the first end portion of the first collecting pipe and being in communication with the second sub-cavity, the first sub-cavity being in communication with the refrigerant channel.

According to another aspect of the present disclosure, it provides a heat exchange system including a compressor, at least one first heat exchanger, a throttling device and at least one second heat exchanger. The first heat exchanger and/or the second heat exchanger is the heat exchanger described above. The heat exchanger can relatively improve the distribution uniformity of a refrigerant during system operation, thereby increasing its heat exchange efficiency. When the refrigerant flows in the heat exchange system, the refrigerant flows into the first heat exchanger through the compressor, flows into the throttling device after heat exchange occurs in the first heat exchanger, then flows into the second heat exchanger, and then flows into the compressor again after heat exchange occurs in the second heat exchanger.

In the present disclosure, a partition plate is disposed in the first collecting pipe. The partition plate divides the first inner cavity of the first collecting pipe into two sub-cavities (a first sub-cavity and a second sub-cavity) parallel in a length direction of the first collecting pipe. When the gas-liquid two-phase refrigerant flows into the first collecting pipe, it first enters one sub-cavity (the second sub-cavity), then enters the other sub-cavity (the first sub-cavity), and then enters the heat exchange tubes, thereby improving the distribution uniformity.

Figure 1:
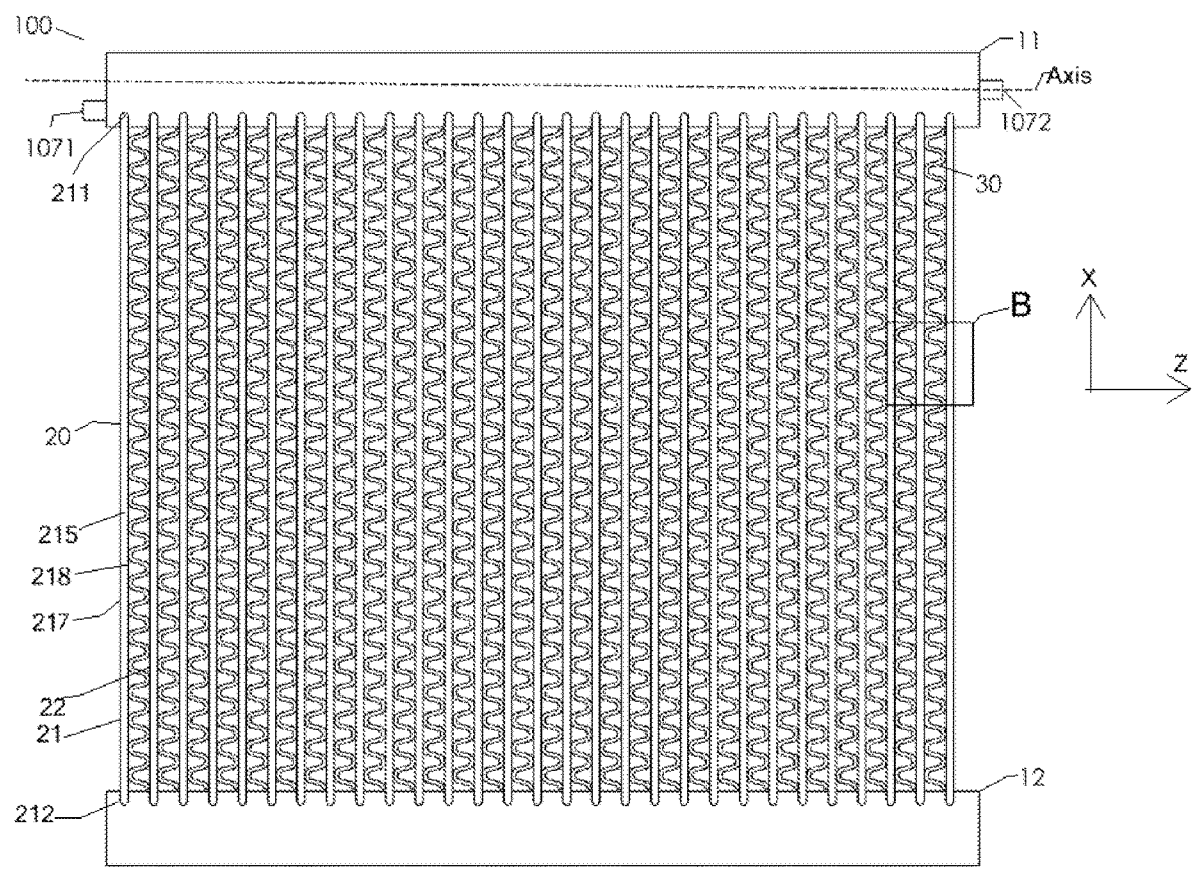
FIG. 1 is a schematic structural view of a heat exchanger in accordance with an embodiment of the present disclosure.

REFERENCE SIGNS heat exchanger 100, 200; collecting pipe 10, first collecting pipe 11, second collecting pipe 12; first inner cavity 101; second inner cavity 102; baffle plate 103; partition plate 104; first insertion hole 105; first end portion 113; second end portion 114; third end portion 213; fourth end portion 214; first pipe portion 111; second pipe portion 112; first cavity 1110; second cavity 1120; first sub-cavity 1111; second sub-cavity 1112; second insertion hole 1041; first through hole 1042; first surface 1043; second surface 1044;

heat exchange tube 20; first heat exchange tube 21; second heat exchange tube 22; first end 211, 221; second end 212, 222; rib 231; flow channel 232; protrusion 233; first end surface 2111, 2211; second end surface 2121, 2221; first side wall 215; second side wall 216; first top wall 217; first bottom wall 218; third side wall 225; fourth side wall 226; second top wall 227; second bottom wall 228;

fin 30; wave crest portion 31; wave trough portion 32; side wall portion 33; wave crest 311; wave trough 321;

heat exchange system 1000; compressor 1; first heat exchanger 2; throttling device 3; second heat exchanger 4; reversing device 5.

DETAILED DESCRIPTION

The exemplary embodiments will be described in detail here, and examples thereof are shown in the drawings. When the following description refers to the drawings, unless otherwise indicated, the same numbers in different drawings indicate the same or similar elements. The implementation embodiments described in the following exemplary embodiments do not represent all implementation embodiments consistent with the present disclosure. On the contrary, they are merely examples of devices and methods consistent with some aspects of the present disclosure as detailed in the appended claims.

The terms used in the present disclosure are only for the purpose of describing specific embodiments, and are not intended to limit the present disclosure. In the description of the present disclosure, it should be understood that the terms "center", "longitudinal", "transverse", "length", "width", "thickness", "upper", "lower", "front", "rear", "left", "right", "vertical", "horizontal", "top", "bottom", "inner", "outer", "clockwise", "counterclockwise" and other directions or positional relationships are based on the positions or positional relationships shown in the drawings, and are only for the convenience of describing the disclosure and simplifying the description. It does not indicate or imply that the pointed devices or elements must have specific orientations, be constructed and operated in specific orientations, thereby it cannot be understood as a limitation of the present disclosure. In addition, the terms "first" and "second" are only used for descriptive purposes, and cannot be understood as indicating or implying relative importance or implicitly indicating the number of indicated technical features. Thus, the features defined with "first" and "second" may explicitly or implicitly include one or more of these features. In the description of the present disclosure, "a plurality of" means two or more than two, unless otherwise specifically defined.

In the description of the present disclosure, it should be noted that, unless otherwise clearly specified and limited, the terms "installation", "connected" and "connection" should be understood in a broad meaning. For example, it can be a fixed connection, a detachable connection or an integral connection; it can be a mechanical connection or an electrical connection; it can be directly connected or indirectly connected through an intermediate medium, including the connection between two internal elements or the interaction between two elements. For those of ordinary skill in the art, the specific meanings of the above-mentioned terms in the present disclosure can be understood according to specific circumstances.

In the present disclosure, unless otherwise clearly defined and limited, a first feature located "upper" or "lower" of a second feature may include the first feature and the second feature are in direct contact with each other, or may include the first feature and the second feature are in direct contact but through other features therebetween. Moreover, the first feature located "above", "over" or "on top of" the second feature includes the first feature is directly above and obliquely above the second feature, or it simply means that the level of the first feature is higher than that of the second feature. The first feature located "below", "under" and "at bottom of" the second feature includes the first feature is directly below and obliquely below the second feature, or it simply means that the level of the first feature is lower than the second feature. The exemplary embodiments of the present disclosure will be described in detail below with reference to the drawings. In the case of no conflict, the following embodiments and features in the embodiments can be mutually supplemented or combined with each other.

The terms used in the present disclosure are only for the purpose of describing specific embodiments, and are not intended to limit the present disclosure. The singular forms of "a", "said" and "the" described in the present disclosure and appended claims are also intended to include plural forms, unless the context clearly indicates otherwise.

The exemplary embodiments of the present disclosure will be described in detail below with reference to the drawings. In the case of no conflict, the following embodiments and features in the embodiments can be combined with each other.

Related heat exchangers, especially in air-conditioning systems, the heat exchangers include collecting pipes and heat exchange tubes. The collecting pipe includes a pipe wall and an inner cavity. The heat exchange tube includes a tube wall and a refrigerant channel. One end of the heat exchange tube is inserted into the collecting pipe through a heat exchange tube insertion hole disposed on the pipe wall of the collecting pipe. The refrigerant channel of the heat exchange tube communicates with the inner cavity of the collecting pipe. When the refrigerant flows into the heat exchanger, it firstly flows into the inner cavity of the collecting pipe and is distributed, and then enters the heat exchange tubes. In a heat exchange system, when the heat exchanger is used as an evaporator, the entering refrigerant may be in a gas-liquid two-phase state. As a result, the uniformity of the refrigerant when it enters the heat exchange tubes after being distributed through the collecting pipe is likely to be low, and the distribution uniformity of the refrigerant in the related heat exchanger needs to be improved. Embodiments of the present disclosure provides heat exchangers which can relatively improve the distribution uniformity of the refrigerant when used in a heat exchange system. The heat exchanger can be used as an evaporator in a heat pump system to improve the distribution uniformity of the refrigerant. It is understandable that in addition to being used in the heat pump system as an outdoor heat exchanger, the present heat exchanger can also be used in other air treatments. There is no restriction here.

In the related art, the collecting pipe used in the heat exchanger is one or more of a circular collecting pipe, a D-type collecting pipe, an elliptical pipe and a square pipe. The heat exchange tube is a flat heat exchange tube. The collecting pipes all have a length direction. A section perpendicular to its length direction is defined as a cross section. The cross section of the circular collecting pipe is a ring structure, and its inner diameter is d1. The cross section of the D-shaped collecting pipe includes an arc section and a straight section, its cross section is roughly D-shaped, and a width of the straight section is d2. The cross section of the elliptical pipe is roughly an ellipse ring, and a longer diameter of the ellipse is d3. Similarly, the cross section of the square pipe is roughly square, and a wider side of the square is d4. Wherein a width d of the heat exchange tube satisfies one of the following conditions:

(1) when the collecting pipe is a circular pipe, the width d of the heat exchange tube is smaller than the inner diameter d1 of the cross section of the collecting pipe;
(2) when the collecting pipe is a D-shaped pipe, the collecting pipe includes an arc-shaped wall and a straight wall, and the width of the heat exchange tube is smaller than the width d2 of the straight section of the collecting pipe;
(3) when the collecting pipe is an elliptical pipe, the width of the heat exchange tube is smaller than the inner diameter d3 of the cross section of the collecting pipe;
(4) when the collecting pipe is a square tube, the width of the heat exchange tube is at least smaller than the wider side d4 of the square pipe.

Figure 2:
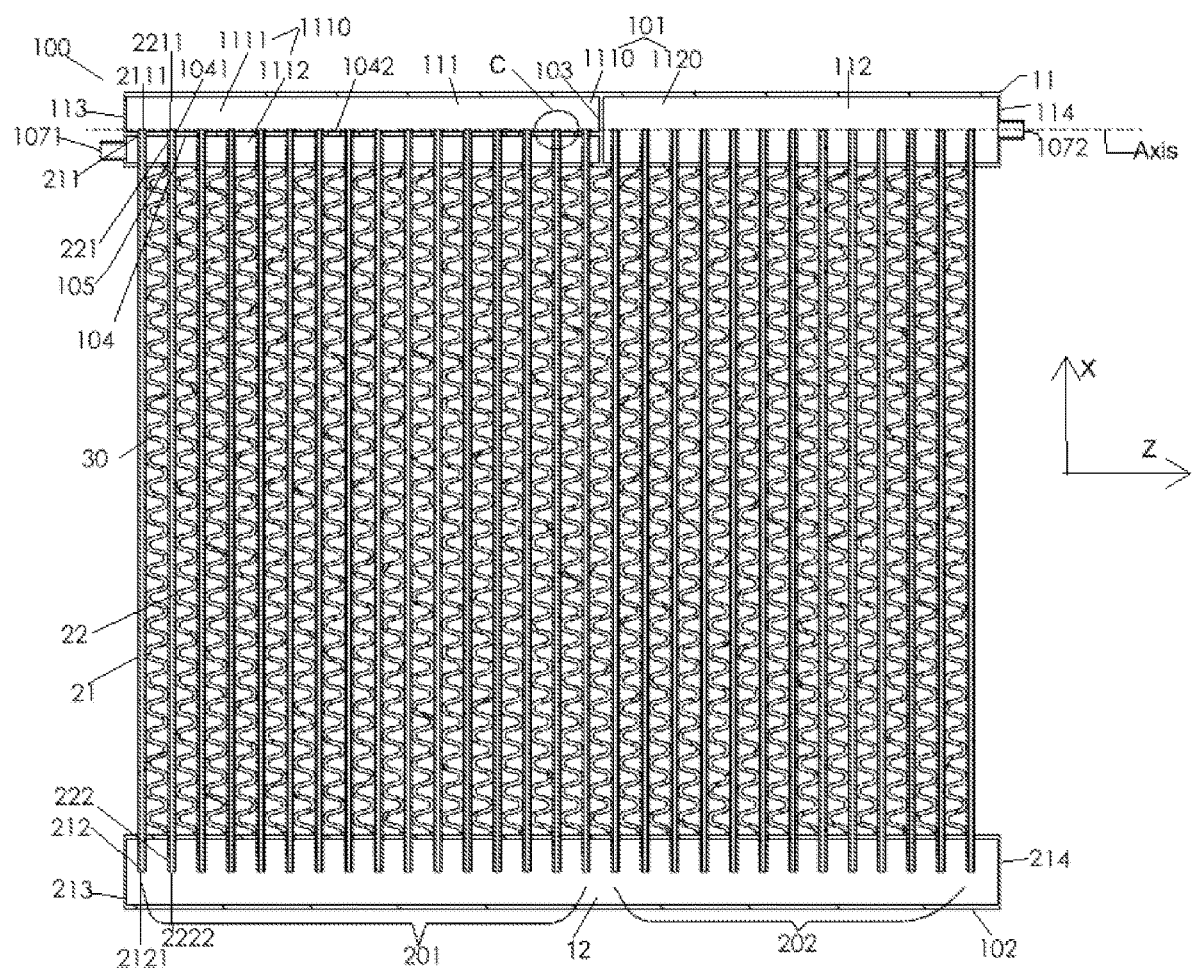
FIG. 2 is a schematic cross-sectional view of the heat exchanger along an A-A direction of an embodiment of the present disclosure shown in FIG. 9.
Figure 9:
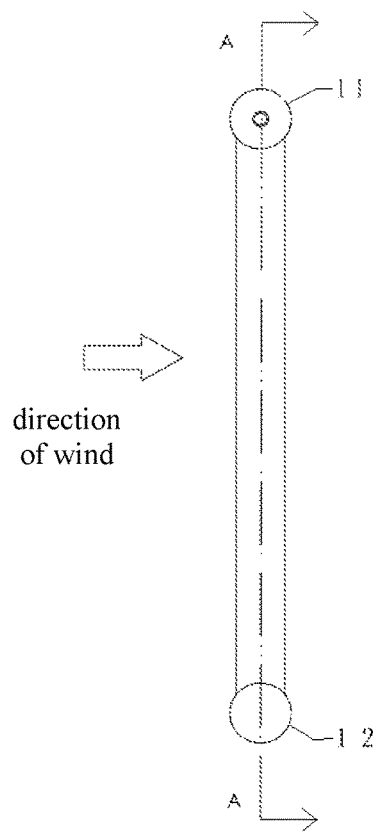
FIG. 9 is a schematic structural view of the heat exchanger of the embodiment of FIGS. 1 to 3 along a height direction of the heat exchange tube.

As shown in FIGS. 1 and 2, and in conjunction with other drawings when necessary, specific embodiments of the heat exchanger of the present disclosure will be described. FIG. 1 is a schematic structural view of the heat exchanger according to an embodiment of the present disclosure. FIG. 9 is a schematic structural view of the heat exchanger in FIG. 1 along the height direction of the heat exchange tube. FIG. 2 is a schematic cross-sectional view of the heat exchanger along the A-A direction of an embodiment of the disclosure in FIG. 9. The specific description is as follows.

The heat exchanger 100 of an embodiment of the present disclosure may include collecting pipes 10, a plurality of heat exchange tubes 20 and fins 30. The collecting pipe 10 has an inner cavity (not labeled in the drawings) for the refrigerant to flow, and the shape of the collecting pipe 10 is a circular pipe. The length direction of the collecting pipe 10 is an axial direction. The collecting pipes 10 have two collecting pipes, namely a first collecting pipe 11 and a second collecting pipe 12. The first collecting pipe 11 and the second collecting pipe 12 are disposed substantially in parallel. To illustrate one point, the heat exchanger 100 and the air generally only undergo heat exchange once, which is often referred to as a single-layer heat exchanger in the industry. Of course, in some other embodiments, the collecting pipe 10 may also be a D-shaped or square pipe, and its specific shape is not limited, as long as its burst pressure meets the needs of the system. The relative position of the collecting pipe 10 is also not limited, as long as it meets the actual installation requirements. The number of the collecting pipe 10 can also be only one, as long as it meets the heat exchange requirement, and it is not limited here. The collecting pipe 10 in the embodiment of the present disclosure is a circular pipe as an example.

There are a plurality of heat exchange tubes 20. The heat exchange tubes 20 all have a length direction, a width direction and a height direction. The plurality of heat exchange tubes 20 are disposed along the axial direction of the collecting pipe 10 and disposed substantially in parallel. Each of the plurality of heat exchange tubes 20 has a first end and a second end. As shown in FIG. 1, the heat exchange tubes 20 include a first heat exchange tube 21 and a second heat exchange tube 22 which are disposed side by side. The first heat exchange tube 21 has a first end 211 and a second end 212. A direction from which the first end 211 of the heat exchange tube 21 extends to the second end 212 is the length direction of the heat exchange tube (an X direction in the drawings). Along the two ends of the heat exchange tube in the height direction, the first heat exchange tube 21 has a first top wall 217 and a first bottom wall 218. The first top wall 217 and the first bottom wall 218 are disposed substantially in parallel. The height direction of the heat exchange tube may also be referred to as a thickness direction of the heat exchange tube. Along the two ends of the heat exchange tube in the width direction, the first heat exchange tube 21 has a first side wall 215 and a second side wall 216. The first side wall 215 and the second side wall 216 are substantially opposite to each other. The first end 211 of the first heat exchange tube 21 has a first end surface 2111. The second end 212 of the first heat exchange tube 21 has a second end surface 2121. The first end surface 2111 and the second end surface 2121 are substantially the same and substantially parallel. An inside of the first heat exchange tube 21 also has a channel 232 for the refrigerant to flow. Similarly, the second heat exchange tube 22 has a first end 221, a second end 222, a first end surface 2211 and a second end surface 2221. The second heat exchange tube 22 also has a third side wall 225 corresponding to the first side wall 215, a fourth side wall 226 corresponding to the second side wall 216, a second top wall 227 corresponding to the first top wall 217, a second bottom wall 228 corresponding to the first bottom wall 218 and the refrigerant flow channel 232.

The first end 211 of the first heat exchange tube 21 is connected to the first collecting pipe 11. The second end 212 of the first heat exchange tube 21 is connected to the second collecting pipe 12. Similarly, the first end 221 of the second heat exchange tube 22 is connected to the first collecting pipe 11. The second end 222 of the second heat exchange tube 22 is connected to the second collecting pipe 12. The first heat exchange tube 21 and the second heat exchange tube 22 are disposed substantially in parallel. The heat exchange tube 20 has an inner cavity (not labeled in the drawings) for the refrigerant to flow. Such connection makes the inner cavity of the heat exchange tube 20 communicate with the inner cavity of the collecting pipe 10 so as to form a refrigerant flow channel of the heat exchanger 100 (not labeled in the drawings). The refrigerant can flow in the heat exchange channel, and heat exchange can be realized through the heat exchanger 100.

Figure 4:
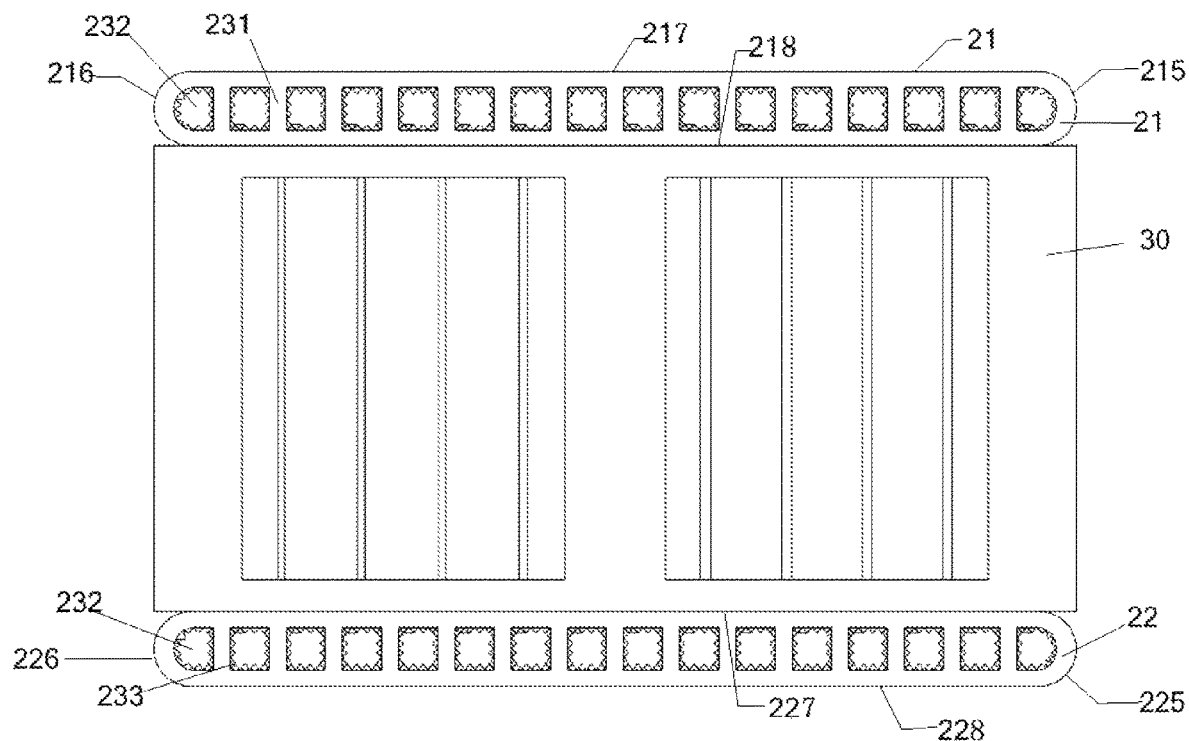
FIG. 4 is a schematic cross-sectional view of heat exchange tubes and fin assembly structure of the present disclosure.
Figure 5:
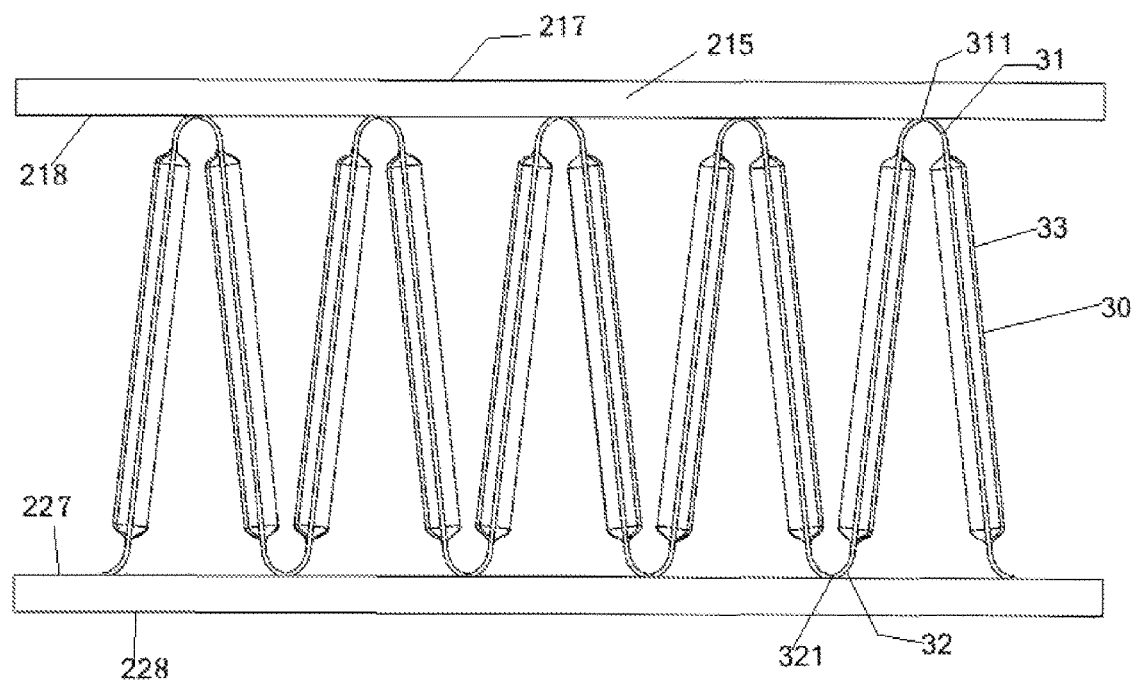
FIG. 5 is a schematic view of the structure of the heat exchange tubes and fins in zone B in FIG. 1.

It should be noted that the heat exchange tube 20 is also referred to as a flat tube in the industry, and it has an inner cavity for the refrigerant to flow. As shown in FIG. 4, the inner cavity of the heat exchange tube 20 (not labeled in the drawings) is usually separated by ribs 231 into a plurality of refrigerant flow channels 232. This arrangement not only increases the heat exchange area of the heat exchange tube 20, but also improves the heat exchange efficiency. Moreover, the inner surface of the heat exchange tube 20 may also be provided with tiny protrusions 233. The protrusions 233 can form a capillary effect to enhance heat exchange. The protrusion 233 can be sawtooth, wave, triangle, etc. (not labeled in the drawings), and its shape can be set as required. Adjacent channels 232 are isolated from each other. The plurality of channels 232 are disposed in a row to jointly affect the width of the heat exchange tube 20. The heat exchange tube 20 is flat as a whole, its length is greater than its width, and its width is greater than its thickness. The heat exchange tube mentioned here is not limited to this type, and may be of other forms. For example, adjacent channels may not be completely isolated. For another example, all the channels can be disposed in two rows, as long as the width is still greater than the thickness.

Figure 3:
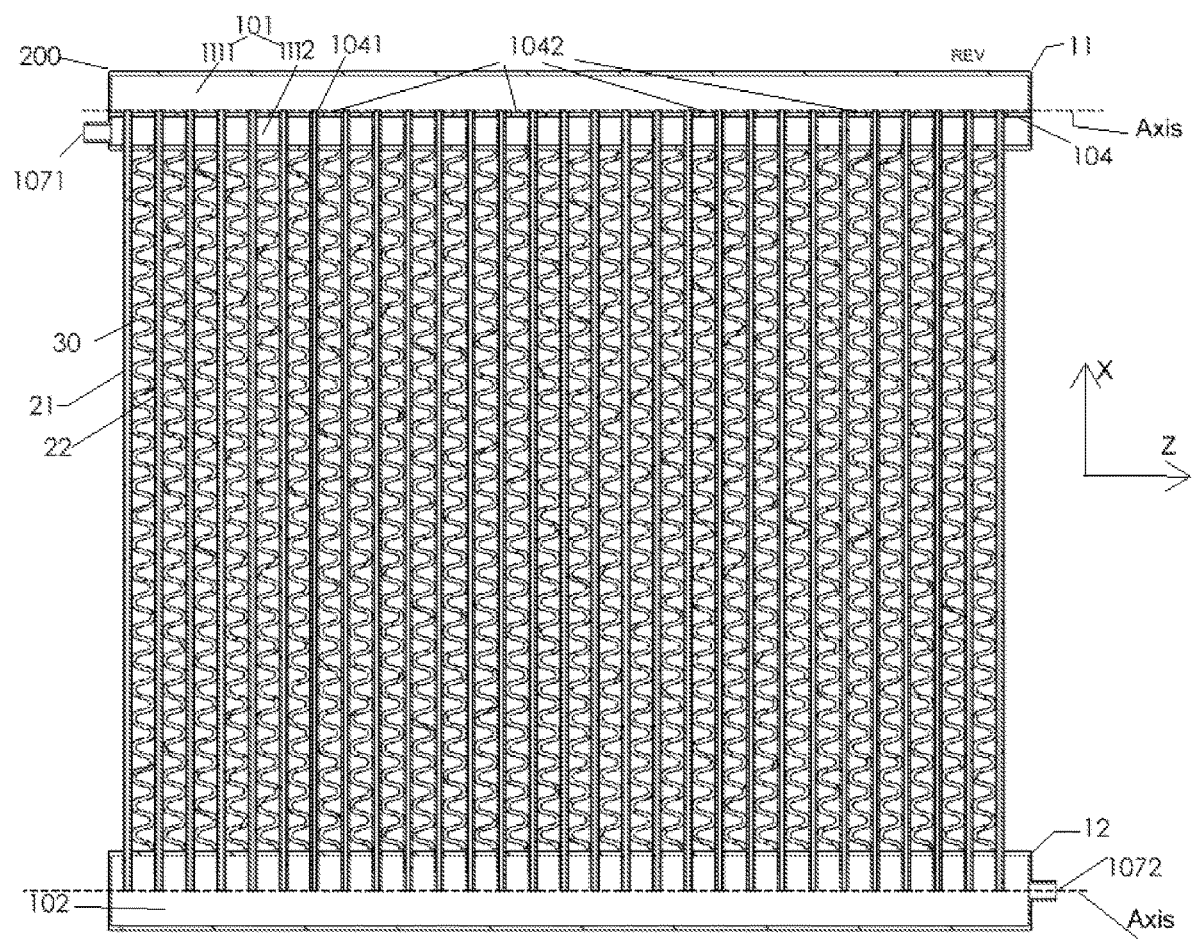
FIG. 3 is a schematic cross-sectional view of a heat exchanger along the A-A direction of another embodiment of the present disclosure.

Both the first collecting pipe 11 and the second collecting pipe 12 have pipe walls (not labeled). The first collecting pipe 11 has a first inner cavity 101. The second collecting pipe 12 has a second inner cavity 102. The axial direction of the first collecting pipe 11 and the second collecting pipe 12 is defined as the length direction of the collecting pipe (i.e., a Z direction in the drawing). The first collecting pipe 11 has a first end portion 113 and a second end portion 114 in its length direction. The second collecting pipe 21 has a third end portion 213 and a fourth end portion 214 at two ends in the length direction thereof. The third end portion 213 is corresponding to the first end portion 113 of the first collecting pipe 11, and the fourth end portion 214 is corresponding to the second end 213 of the first collecting pipe 11. The first inner cavity 101 of the first collecting pipe 11 is provided with a baffle plate 103 and a partition plate 104. The baffle plate 103 is substantially perpendicular to the axial direction of the first collecting pipe 11. The number of the baffle plate 103 is at least one. In some other embodiments, the number of the baffle plate 103 may be multiple. In other embodiments, as shown in FIG. 3, the baffle plate 103 may not be provided. In other words, the baffle plate 103 can be set according to the requirements of the process setting, which will not be repeated here.

In the embodiment of the present disclosure, the baffle plate 103 divides the first collecting pipe 11 into a first pipe portion 111 and a second pipe portion 112, and divides the first inner cavity 101 of the first collecting pipe 11 into a first cavity 1110 and second cavity 1120. The first pipe portion 111 has the first cavity 1110. The second pipe portion 112 has the second cavity 1120. The partition plate 104 is provided in the first cavity 1110 along the axial direction of the collecting pipe. The partition plate 104 extends from the first end portion 113 of the first collecting pipe 11 along the axial direction of the first collecting pipe 11 toward the baffle plate 103. In addition, the partition plate 104 divides the first cavity 1110 into a first sub-cavity 1111 and a second sub-cavity 1112. One end of the partition plate 104 is connected to the first end portion 113, and the other end of the partition plate 104 is connected to the baffle plate 103. The partition plate 104 defines a plurality of through holes 1042 communicating with the first sub-cavity 1111 and the second sub-cavity 1112.

The pipe walls of the first collecting pipe 11 and the second collecting pipe 12 also include first insertion holes 105 for inserting the heat exchange tubes 20. The first insertion hole 105 extends through the pipe walls of the first collecting pipe 11 and the second collecting pipe 12. There are a plurality of first insertion holes 105 which are disposed in parallel with each other. The first ends 211, 221 of the heat exchange tubes 20 can be inserted into the first collecting pipe 11 through the first insertion holes 105. The first inner cavity 101 of the first collecting pipe 11 is in communication with the refrigerant channels 232 of the heat exchange tubes 20. The partition plate 104 defines second insertion holes 1041 for inserting the heat exchange tubes 20. There a plurality of second insertion holes 1041 which are disposed in parallel with each other. The second insertion holes 1041 extend through the partition plate 104. The first ends 211, 221 of the heat exchange tubes 20 extend through the first insertion holes 105 and are inserted into the second insertion holes 1041. Along an insertion direction of the heat exchange tube (that is, the X direction in the drawing), the projection of the first insertion holes 105 is approximately the same as and overlaps with the projection of the second insertion holes 1041, and the projection of the second insertion holes 1041 and the projection of the through holes 1042 do not overlap. In other words, the second insertion holes 1041 are staggered from the through holes. Specifically, the refrigerant channels 232 of the heat exchange tubes 20 are in communication with the first sub-cavity 1111 and the second sub-cavity 1112 of the first collecting pipe 11, wherein the communication part between the refrigerant channels 232 of the heat exchange tubes 20 and the first sub-cavity 1111 of the first collecting pipe 11 refers to the communication with the first sub-cavity 1111.

As shown in FIG. 2, the heat exchanger 100 further includes a first inlet/outlet 1071 and a second inlet/outlet 1072. The first inlet/outlet 1071 is disposed at the first end portion 113 of the first collecting pipe 11. The second inlet/outlet 1072 is disposed at the second end portion 114 of the first collecting pipe 11. The first inlet/outlet 1071 is in communication with the second sub-cavity 1112. When the heat exchanger 100 is used in a heat exchange system, after the refrigerant flows into the second sub-chamber 1112 through the first inlet/outlet 1071 during the operation of the heat exchange system, it passes through all the through holes 1042 of the partition plate 104, then flows into the first sub-cavity 1111, and then flows into the refrigerant channels 232 of the heat exchange tubes 20.

Each of the first pipe portion 111 and the second pipe portion 112 includes a plurality of first insertion holes 105 on the pipe walls. The first ends 211, 221 of the heat exchange tubes 20 are inserted into the first insertion holes 105 of the first collecting pipe 11 and then inserted into the second insertion holes 1041.

Figure 6:
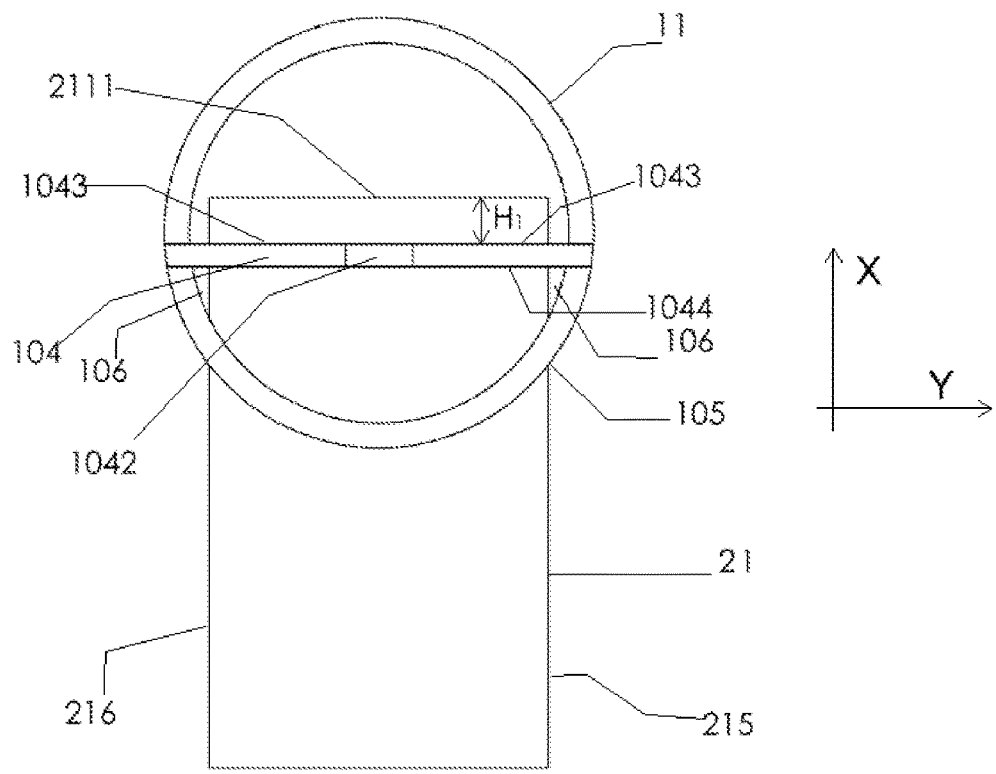
FIG. 6 is a schematic cross-sectional view of an assembly of the heat exchange tubes and a collecting pipe in the present disclosure.

As shown in FIGS. 1 to 3 and in combination with FIG. 6, the partition plate 104 has a first surface 1043 and a second surface 1044 which are disposed oppositely. The first surface 1043 is a surface of the partition plate 104 facing the first sub-cavity 1111. The second surface 1044 is a surface of the partition plate 104 facing the second sub-cavity 1112. There is a gap 106 between a part of the inner wall surface of the first collecting pipe 11 and the second surface 1044 of the partition plate 104. Specifically, the gap 106 is formed among the outer wall portions of the heat exchange tubes 20 which are inserted into of the second sub-cavity 1112, an inner wall portion of the first collecting pipe 11 which forms the second sub-cavity 1112, and the second surface 1044 of the partition plate 104. The heat exchange tubes 20 connected to the first pipe portion 111 are first process heat exchange tubes 201. The heat exchange tubes 20 connected to the second pipe portion 112 are second process heat exchange tube 202. When a refrigerant flows in the heat exchanger 100, the refrigerant flows into the second sub-cavity 1112 through the first inlet/outlet 1071, and after encountering the resistance of the heat exchange tube 20, the refrigerant flows through the gaps 106 on both sides of the heat exchange tube 20 under the action of pressure. Due to the limited width of the gap 106, the turbulence effect of the two-phase refrigerant in the second sub-cavity 1112 can be intensified in this way, so that the two-phase refrigerant is uniformly mixed. Then, the refrigerant flows into the first sub-cavity 1111 through the through holes 1042 of the partition plate 104. Under the action of pressure, the refrigerant flows into the refrigerant channels 232 through the first ends 211 of the first process heat exchange tubes 201, then flows into the second inner cavity 102 of the second collecting pipe 12, then flows into the refrigerant flow channels 232 of the second process heat exchange tubes 202, then enters the second cavity 1120 of the first collecting pipe 11, and then flows out of the heat exchanger 100 through the second inlet/outlet 1072. In the above processes, the refrigerant and the heat exchanger 100 realize heat exchange. It should be noted that, in the above heat exchange processes, the heat exchange of the refrigerant in the heat exchanger 100 is the heat exchange of two processes. In other words, the heat exchanger 100 is a dual-process heat exchanger. In some other embodiments, the heat exchanger 100 can also be a heat exchanger with more than two processes, which can be designed according to actual needs.

FIG. 3 is a schematic cross-sectional view of a heat exchanger 200 according to another embodiment. The structures of the heat exchanger 200 and the heat exchanger 100 are substantially the same. The heat exchanger 200 also includes the first collecting pipe 11 and the second collecting pipe 12. The differences are that the baffle plate 103 shown in FIG. 2 is not provided in the first collecting pipe 11, and the partition plate 104 divides the entire first inner cavity 102 of the first collecting pipe 11 into the parallel first sub-cavity 1111 and the second sub-cavity 1112. After the first ends 211, 221 of the heat exchange tubes 20 are inserted into the first collecting pipe 11 through the first insertion holes 105 on the pipe wall, they are then inserted into the second insertion holes 1041 of the partition plate 104. The first inlet/outlet 1071 is provided at the first end portion 113 of the first collecting pipe 11 and communicates with the second sub-cavity 1112. The second inlet/outlet 1072 is provided at the fourth end portion 214 of the second collecting pipe 12. When the refrigerant flows into the heat exchanger, the refrigerant flows into the second sub-cavity 1112 through the first inlet/outlet 1071. The refrigerant generates multiple turbulent flows in the second sub-cavity 1112, and then flows into the first sub-cavity 1111 through the through holes 1042 of the partition plate 104. Then, the refrigerant flows into the refrigerant channels 232 of the heat exchange tubes 20 through the first ends 211, 221 of the heat exchange tubes 20, then flows into the second inner cavity 102 of the second collecting pipe 12, and then flows out of the heat exchanger 200 through the second inlet/outlet 1072. To illustrate one point, the heat exchanger 200 and the air generally only undergo heat exchange once, which is often referred to as a single-layer heat exchanger in the industry.

The distribution structure in the embodiment of the present invention is not limited to single-layer heat exchangers, but can also be used in other multi-layer heat exchangers. The multi-layer heat exchanger can be a heat exchanger in which the heat exchange tubes are bent, or a heat exchanger in which adjacent collecting pipes are connected through a connection module. Their structures are roughly the same and will not be repeated here. It should be noted that when the multi-layer heat exchanger is a heat exchanger in which the heat exchange tubes are bent, the length direction of the heat exchange tube is an extending direction of the heat exchange tubes. In other words, the length direction is not limited to a linear direction.

FIG. 6 is a schematic cross-sectional view of an assembly of the first heat exchange tube 21 and the first collecting pipe 11.

Figure 8:
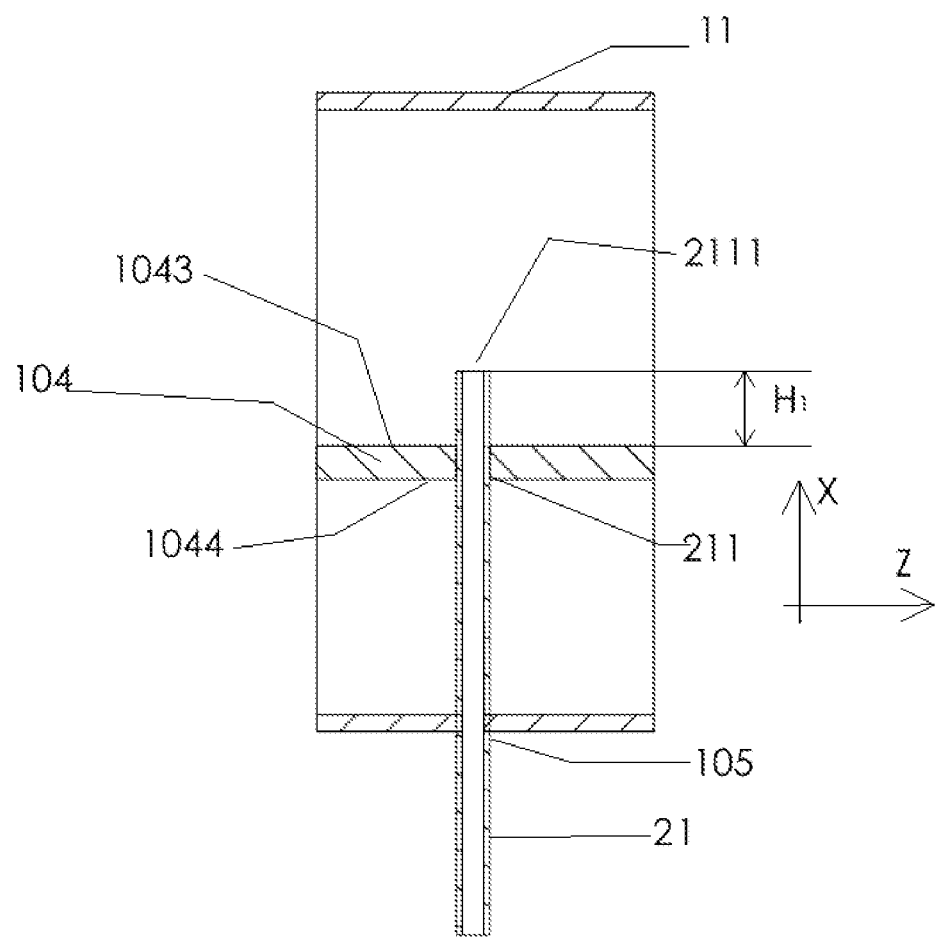
FIG. 8 is a schematic cross-sectional view of another assembly method of the heat exchange tube and the partition plate of the present disclosure.

FIG. 8 shows a schematic cross-sectional view in which the first heat exchange tube 21 is inserted into the second insertion hole 1041 of the partition plate 104 of the first collecting pipe 11. In combination of FIGS. 6 and 8, after the first end 211 of the first heat exchange tube 21 is inserted into the first inner cavity 101 of the first collecting pipe 11 through the first insertion hole 105, and then inserted into the partition plate 104 through the second insertion hole 1041 of the partition plate 104, the first end surface 2111 of the first heat exchange tube 21 extends through the partition plate 104. A distance between the first end surface 2111 of the first heat exchange tube 21 and the first surface 1043 of the partition plate 104 is a first distance H1, and the first distance H1 is less than 2 mm. In some other embodiments, the first distance H1 is 1 mm. In some other embodiments, the first distance H1 is 0.5 mm.

Figure 7:
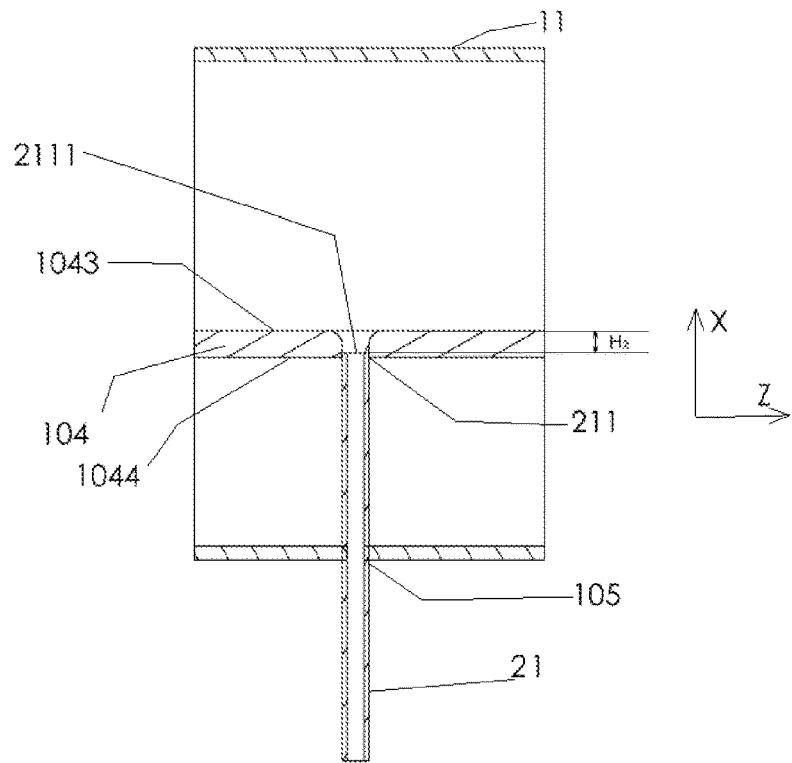
FIG. 7 is a schematic cross-sectional view of an assembly method of the heat exchange tube and a partition plate of the present disclosure.

FIG. 7 is a schematic cross-sectional view showing another way of assembling the first heat exchange tube 21 and the partition plate 104 of the present disclosure. In combination of FIGS. 6 and 7, after the first end 211 of the first heat exchange tube 21 is inserted into the first collecting pipe 11 through the first insertion hole 105, it is then inserted into the partition plate 104 through the second insertion hole 1042 of the partition plate 104. However, the first end surface 2111 of the first heat exchange tube 21 does not extend beyond the partition plate 104. A distance between the first end surface 2111 of the first heat exchange tube 21 and the first surface 1043 of the partition plate 104 is a second distance H2. The second distance H2 is smaller than a thickness of the partition plate 104. The thickness of the partition plate 104 may be 1 to 3 mm. The second distance H2 may be 2 mm. In some other embodiments, the second distance H2 is 1 mm. In some other embodiments, the second distance H2 is 0.5 mm.

As shown in FIGS. 1 to 5, the heat exchanger 100 and the heat exchanger 200 of the embodiment of the present disclosure further include fins 30. It is worth noting that the surface of the heat exchanger in the related art is coated with a functional material, such as a corrosion-resistant material. Specifically, it is coated on all or part of the outer surface of the entire heat exchanger. The functional material may be a corrosion-resistant material or a moisture-absorbing material, etc., which can be set as required and will not be repeated here. The fin 30 is a window fin. To illustrate one point, in other embodiments, the fins may also be non-opening fins. The shape of the fin can be roughly corrugated or profiled. The cross section of the fin can be a sine wave, or an approximate sine wave, or a sawtooth wave, as long as it meets the requirements, and its specific structure is not limited. Of course, the fin 30 can be coated with a functional material as required, which is not limited here.

The fin 30 in the embodiment of the present disclosure is a corrugated fin. The fin 30 has a wave crest portion 31, a wave trough portion 32, and side wall portions 33 connecting the wave crest portion 31 and the wave trough portion 32. The wave crest portion 31 and the wave trough portion 32 are disposed at intervals in a longitudinal direction of the fin 30. There are a plurality of side wall portions 33. To illustrate one point, the meaning of "a plurality of" in the present disclosure refers to two and more than two, unless otherwise specified. The side wall portion 33 can be provided with or without opening windows, which can be provided according to heat exchange requirements. In some other embodiments, the shape of the fin 30 may be substantially corrugated, or may be a profile. The cross section of the fin can be a sine wave, or an approximate sine wave, or a sawtooth wave, as long as it meets the requirements, and its specific structure is not limited.

In the embodiment of the present disclosure, the fin 30 has a wave shape as a whole. The wave crest portion 31 and the wave trough portion 32 are spaced apart. The fin 30 is disposed between two adjacent heat exchange tubes 20. The wave crest portion 31 is at least partially in contact with the first heat exchange tube 21. The wave trough portion 32 is at least partially in contact with the second heat exchange tube 22. Wherein the highest point of the wave crest portion 31 is a wave crest 311. The lowest point of the wave trough portion 32 is a wave trough 321. That is, the wave crest portion 31 is in contact with the first bottom wall 218 of the first heat exchange tube 21, and the wave trough portion 32 is in contact with the first top wall 227 of the second heat exchange tube 22. An extending direction of the wave crest portion 31 and the wave trough portion 32 of the fin 30 disposed at intervals is defined as a length direction of the fin 30 (the X direction in the drawings). A vertical direction between a plane where the wave crest 311 is located and a plane where the wave trough 321 is located is defined as a height direction of the fin (the Z direction in the drawings). It can be seen that the length direction of the fin 30 is the same as the length direction of the heat exchange tube 20 (the X direction in the drawings). The width direction of the fin 30 is the same as the width direction of the heat exchange tube 20 (the Y direction in the drawings). A distance between the heat exchange tubes 20 is the height direction of the fin 30 (the Z direction in the drawing).

Figure 10:
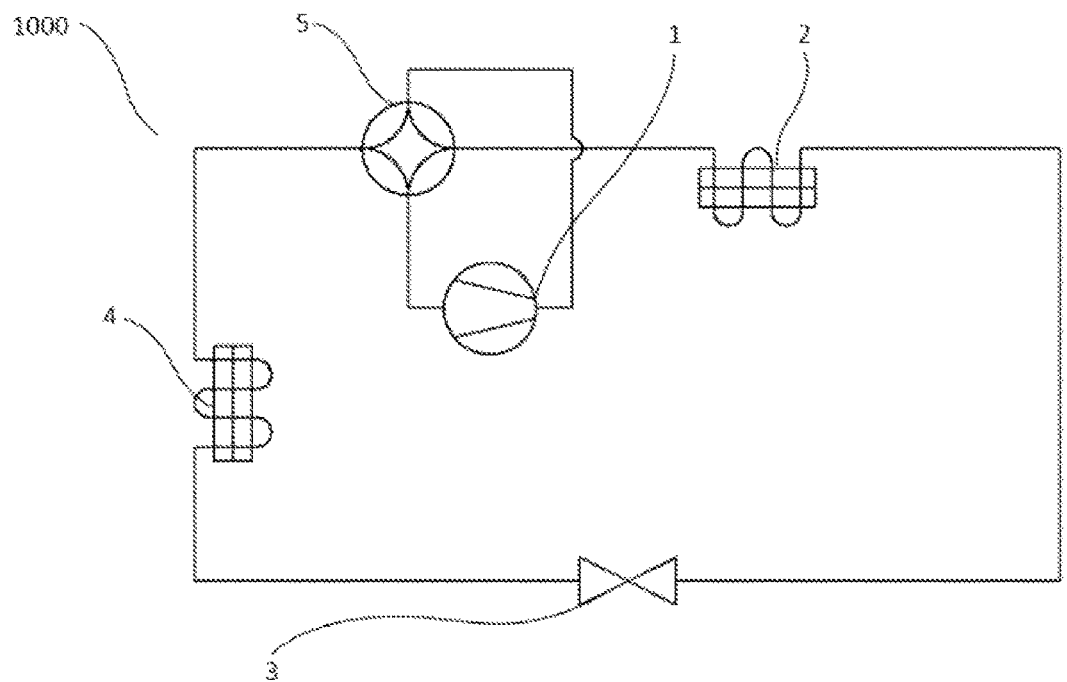
FIG. 10 is a schematic view of an exemplary heat exchange system of the present disclosure.

As shown in FIG. 10, it is a heat exchange system 1000 shown in an exemplary embodiment of the present disclosure. The heat exchange system 1000 at least includes a compressor 1, a first heat exchanger 2, a throttling device 3, a second heat exchanger 4 and a reversing device 5. Optionally, the compressor 1 of the heat exchange system 1000 may be a horizontal compressor or a vertical compressor. Optionally, the throttling device 3 may be an expansion valve. In addition, the throttling device 3 can also be other components which have the function of reducing pressure and adjusting the flow rate of the refrigerant. The present disclosure does not specifically limit the types of throttling devices, which can be selected according to the actual application environment, and will not be repeated here. It should be noted that in some systems, the reversing device 5 may not be provided. The heat exchanger 100 described in the present disclosure can be used in the heat exchange system 1000 as the first heat exchanger 2 and/or the second heat exchanger 4. In the heat exchange system 1000, the compressor 1 compresses the refrigerant; the temperature of the refrigerant after being compressed rises and then the refrigerant enters the first heat exchanger 2; the refrigerant transfers heat to the outside through the heat exchange between the first heat exchanger 2 and the outside; after the refrigerant passes through the throttling device 3, the refrigerant becomes a liquid state or a gas-liquid two-phase state. At this time, the temperature of the refrigerant decreases. Then, the refrigerant with a lower temperature flows into the second heat exchanger 4, then exchanges heat with the outside in the second heat exchanger 4, and then enters the compressor 1 again to realize circulation of the refrigerant. When the second heat exchanger 4 is used as an outdoor heat exchanger to exchange heat with the air, referring to the above-mentioned embodiments, the heat exchanger is disposed as required.

The above descriptions are only preferred embodiments of the present disclosure, and do not limit the present disclosure in any form. Although the present disclosure has been disclosed as above in preferred embodiments, it is not intended to limit the present disclosure. Those of ordinary skill in the art, without departing from the scope of the technical solutions disclosed in the present disclosure, can use the technical content disclosed above to make some changes or modifications into equivalent embodiments with equivalent changes. However, without departing from the content of the technical solutions of the present disclosure, any simple modifications, equivalent changes and modifications made to the above embodiments based on the technical essence of the present disclosure still fall within the scope of the technical solutions of the present disclosure.

What is claimed is:

1. A heat exchanger, comprising: a first collecting pipe, a heat exchange tube and a partition plate; the first collecting pipe comprising a pipe wall and a first inner cavity; the first collecting pipe comprising a first end portion and a second end portion in a length direction thereof; the partition plate being disposed in the first inner cavity and extending from the first end portion along the length direction of the first collecting pipe so as to divide the first inner cavity into a first sub-cavity and a second sub-cavity, the first sub-cavity and the second sub-cavity being parallel in the length direction of the first collecting pipe;
   the heat exchange tube comprising a tube wall and a refrigerant channel for refrigerant to flow, the heat exchange tube having a first end and a second end in an extending direction thereof, the refrigerant channel extending from the first end to the second end and extending through the heat exchange tube;
   the pipe wall of the first collecting pipe further defining a first insertion hole, the partition plate defining a second insertion hole corresponding to the first insertion hole, the first end of the heat exchange tube passing through the first insertion hole and being inserted into the second insertion hole;
   the partition plate defining a through hole, the through hole and the second insertion hole being disposed in a staggered manner, the through hole being in communication with the first sub-cavity and the second sub-cavity;
   the heat exchanger further comprising a first inlet/outlet, the first inlet/outlet being disposed at the first end portion of the first collecting pipe and being in communication with the second sub-cavity, the first sub-cavity being in communication with the refrigerant channel.

2. The heat exchanger according to claim 1, wherein the heat exchanger comprises a baffle plate disposed in the first collecting pipe, the baffle plate is substantially perpendicular to the length direction of the first collecting pipe, the baffle plate divides the first collecting pipe into a first pipe portion having a first cavity and a second pipe portion having a second cavity, the partition plate is disposed in the first cavity and extends from the first end portion to the baffle plate along the length direction of the first collecting pipe; wherein the partition plate is connected to both the first end portion and the baffle plate, the partition plate divides the first cavity into the first sub-cavity and the second sub-cavity;
   both the pipe wall of the first pipe portion and the pipe wall of the second pipe portion define the first insertion hole, the partition plate having the second insertion hole is disposed in the first pipe portion, the first end of all the heat exchange tube is inserted through the first insertion hole of the first pipe portion and the second pipe portion, the first end of a part of the heat exchange tube is inserted into the second insertion hole of the first pipe portion, the first end of a remaining part of the heat exchange tube only extends into the second sub-cavity of the second pipe portion, there is no partition plate in the second pipe portion so that there is no second insertion hole for insertion of the first end of the remaining part of the heat exchange tube.

3. The heat exchanger according to claim 1, wherein an inside of the first inner cavity has only the partition plate extending along the length direction of the first collecting pipe, but has no baffle plate perpendicular to the length direction of the first collecting pipe; the partition plate extends from the first end portion to the second end portion, so that the partition plate is connected to both the first end portion and the second end portion; the first end of the heat exchange tube is inserted into the first insertion hole of the first collecting pipe, the partition plate defines a plurality of the second insertion holes, and the first ends of all the heat exchange tube are inserted into the second insertion holes of the partition plate.

4. The heat exchanger according to claim 1, further comprising a second collecting pipe, the second collecting pipe and the first collecting pipe being disposed substantially parallel to each other; the second collecting pipe comprising a pipe wall and a second inner cavity; the second collecting pipe comprising a third end portion and a fourth end portion at two ends in a length direction of the second collecting pipe, the third end portion being corresponding to the first end portion of the first collecting pipe, the fourth end portion being corresponding to the second end portion of the first collecting pipe; the second collecting pipe comprising a third insertion hole corresponding to the first insertion hole, the third insertion hole being provided through the pipe wall of the second collecting pipe; the second end of the heat exchange tube being inserted into the second collecting pipe through the third insertion hole, the refrigerant channel of the heat exchange tube being in communication with the second inner cavity of the second collecting pipe;

the heat exchanger further comprising a second inlet/outlet, the second inlet/outlet being disposed at the fourth end portion of the second collecting pipe or the second end portion of the first collecting pipe.

5. The heat exchanger according to claim 1, wherein the first collecting pipe is one of a circular pipe, an elliptical pipe, a D-shaped pipe and a square pipe.

6. The heat exchanger according to claim 1, wherein the partition plate has a first surface and a second surface which are disposed oppositely, the first surface is a surface of the partition plate facing the first sub-cavity, the second surface is a surface of the partition plate facing the second sub-cavity, the heat exchange tube is fixedly sealed to the pipe wall of the second sub-cavity, and there is a gap between part of an inner wall surface of the first collecting pipe and the second surface of the partition plate.

7. The heat exchanger according to claim 6, wherein the gap is located among an inner wall portion of the first collecting pipe which forms the second sub-cavity, an outer side wall portion of the heat exchange tube which is inserted into the second sub-cavity, and the second surface of the partition plate.

8. The heat exchanger according to claim 6, wherein the first end of the heat exchange tube has a first end surface, the first end of the heat exchange tube is inserted into the second insertion hole and extends beyond the first surface, and a distance between the first end surface of the heat exchange tube and the first surface of the partition plate is less than 2 mm.

9. The heat exchanger according to claim 8, wherein the distance between the first end surface of the heat exchange tube and the first surface of the partition plate is 0.5 mm.

10. The heat exchanger according to claim 6, wherein the first end of the heat exchange tube is inserted into the second insertion hole and does not extend beyond the first surface of the first partition plate, and a distance between the first end surface of the heat exchange tube and the first surface of the partition plate is not greater than a thickness of the partition plate.

11. The heat exchanger according to claim 10, wherein the distance between the first end surface of the heat exchange tube and the first surface of the partition plate is half of the thickness of the partition plate.

12. The heat exchanger according to claim 1, wherein the heat exchange tube comprises ribs which divide the refrigerant flow channel of the heat exchange tube into a plurality of sub-refrigerant channels.

13. The heat exchanger according to claim 12, wherein the heat exchange tube comprises a plurality of protrusions on an inner surface thereof facing each sub-refrigerant channel.

14. The heat exchanger according to claim 1, further comprising a plurality of fins, the heat exchanger comprising a plurality of the heat exchange tubes, the fins being disposed between adjacent heat exchange tubes, and at least part surfaces of the fins being in contact with the heat exchange tube.

15. The heat exchanger according to claim 14, wherein the fin extends along a length direction of the heat exchange tube and is generally wave-shaped, the fin comprises wave crest portions and wave trough portions, the wave crest portions are spaced apart, the fin is disposed between a first heat exchange tube and a second heat exchange tube adjacent to each other; the first heat exchange tube has a first top wall and a first bottom wall on both sides of a height direction; the second heat exchange tube has a second top wall and a second bottom wall located on both sides of the height direction; the wave crest portions are in contact with the first bottom wall of the first heat exchange tube, and the wave trough portions are in contact with the second top wall of the second heat exchange tube.

16. A heat exchange system, comprising: a compressor, a first heat exchanger, a throttling device and a second heat exchanger, the first heat exchanger and/or the second heat exchanger is the heat exchanger according to claim 1; when a refrigerant flows in the heat exchange system, the refrigerant flows into the first heat exchanger through the compressor, flows into the throttling device after heat exchange occurs in the first heat exchanger, then flows into the second heat exchanger, and then flows into the compressor again after heat exchange occurs in the second heat exchanger.

17. A heat exchanger, comprising:
a first collecting pipe including a plurality of first insertion holes, a first inner cavity extending along a horizontal direction, a first end portion and a second end portion disposed at opposite sides of the first inner cavity, respectively;
a second collecting pipe defining a second inner cavity;
a partition plate disposed in the first inner cavity and extending from the first end portion towards to the second end portion along the horizontal direction so as to divide the first inner cavity into a first sub-cavity and a second sub-cavity, the first sub-cavity and the second sub-cavity located on different sides of the partition plate along a vertical direction perpendicular to the horizontal direction, the partition plate defining a plurality of second insertion holes and a plurality of through holes disposed in a staggered manner, the through holes being in communication with the first sub-cavity and the second sub-cavity; and
a plurality of heat exchange tubes each including a first distal section connecting with the first collecting pipe, a second distal section connecting with the second collecting pipe, and a plurality of refrigerant channels being in communication with the first inner cavity and the second inner cavity, the refrigerant channels arranged along a transverse direction perpendicular to the horizontal direction and the vertical direction;
wherein the first end of the heat exchange tube goes through the first insertion hole and inserts into the second insertion hole.

18. The heat exchanger according to claim 17, further comprising a first port and a second port, the first port being disposed at the first end portion of the first collecting pipe and being in communication with the second sub-cavity, the first sub-cavity being in communication with the refrigerant channel;

the second port being disposed at the second collecting pipe or the second end portion of the first collecting pipe.

19. The heat exchanger according to claim 17, further comprising a baffle plate disposed in the first inner cavity and extending along the vertical direction, the baffle plate dividing the first collecting pipe into a first pipe portion with a first cavity and a second pipe portion with a second cavity, the partition plate being disposed in the first cavity and connecting between the first end portion and the baffle plate;

wherein the partition plate divides the first cavity into the first sub-cavity and the second sub-cavity.

20. The heat exchanger according to claim 17, wherein the partition plate has two opposite ends connected to the first end portion and the second end portion, respectively; the first distal sections are inserted through the first insertion holes of the first collecting pipe, and inserted into the second insertion holes of the partition plate.

\* \* \* \* \*